US010984060B2

(12) United States Patent
AuYoung et al.

(10) Patent No.: US 10,984,060 B2
(45) Date of Patent: Apr. 20, 2021

(54) DETECTING ATTRIBUTE CHANGE FROM TRIP DATA

(71) Applicant: Uber Technologies, Inc., San Francisco, CA (US)

(72) Inventors: Alvin AuYoung, San Jose, CA (US); Livia Zarnescu Yanez, Menlo Park, CA (US); Kyle Elliot DeHovitz, San Francisco, CA (US); Ted Douglas Herringshaw, San Francisco, CA (US); Joshua Lodge Ross, San Francisco, CA (US); Vikram Saxena, Cupertino, CA (US); Chandan Prakash Sheth, Fremont, CA (US); Shivendra Pratap Singh, Redwood City, CA (US); Sheng Yang, Fremont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 305 days.

(21) Appl. No.: 15/993,300

(22) Filed: May 30, 2018

(65) Prior Publication Data
US 2019/0163779 A1 May 30, 2019

Related U.S. Application Data

(60) Provisional application No. 62/591,555, filed on Nov. 28, 2017.

(51) Int. Cl.
*G06F 16/9535* (2019.01)
*G06N 20/00* (2019.01)
(Continued)

(52) U.S. Cl.
CPC ...... *G06F 16/9535* (2019.01); *G06F 16/2358* (2019.01); *G06F 16/2379* (2019.01);
(Continued)

(58) Field of Classification Search
CPC ............. G06F 16/9535; G06F 16/2379; G06F 16/9537; G06F 16/2358; G06F 16/248; G06F 16/29; G06N 20/00; G06Q 50/14
See application file for complete search history.

(56) References Cited

U.S. PATENT DOCUMENTS 8,229,458 B2   7/2012 Busch
8,655,883 B1 * 2/2014 Yuksel .................. G06Q 30/02
                                                      707/735
(Continued)

FOREIGN PATENT DOCUMENTS

EP       2413158 A1     2/2012

OTHER PUBLICATIONS

Andrienko, Gennady, et al., "Identifying place histories from activity traces with an eye to parameter impact", IEEE Transactions on Visualization and Computer Graphics 18.5, (2012), 675-688.
(Continued)

*Primary Examiner* — Jensen Hu
(74) *Attorney, Agent, or Firm* — Schwegman Lundberg & Woessner, P.A.

(57) ABSTRACT

Systems and methods for improving attribute data for a point of interest (POI) are provided. A networked system accesses trip data associated with the POI. The networked system generates, using a processor-implemented clustering algorithm, a first spatial cluster and a second spatial cluster using coordinates corresponding to the POI indicated in the trip data. A centroid for the first spatial cluster and a centroid for the second spatial cluster are identified by the networked system. The networked system determines that a difference in distance between the centroid for the first spatial cluster and the centroid for the second spatial cluster meets or transgresses a centroid distance threshold. In response to the determining, a database is updated to indicate a new attribute for the POI, the new attribute corresponds to an attribute
(Continued)

associated with either the first spatial cluster or the second spatial cluster.

20 Claims, 10 Drawing Sheets

(51) Int. Cl.
  *G06F 16/29*    (2019.01)
  *G06F 16/248*    (2019.01)
  *G06F 16/23*    (2019.01)
  *G06F 16/9537*    (2019.01)
  *G06Q 50/14*    (2012.01)

(52) U.S. Cl.
  CPC ............ *G06F 16/248* (2019.01); *G06F 16/29* (2019.01); *G06F 16/9537* (2019.01); *G06N 20/00* (2019.01); *G06Q 50/14* (2013.01)

(56) References Cited

U.S. PATENT DOCUMENTS

| | | | | |
|---|---|---|---|---|
| 9,037,485 | B2* | 5/2015 | Fu | H04L 51/04 705/14.66 |
| 10,505,963 | B1* | 12/2019 | Zaslavsky | H04L 63/1425 |
| 2005/0251331 | A1* | 11/2005 | Kreft | G01C 3/08 701/438 |
| 2009/0326991 | A1 | 12/2009 | Wei et al. | |
| 2011/0218909 | A1 | 9/2011 | Collins et al. | |
| 2011/0238408 | A1* | 9/2011 | Larcheveque | G06F 40/284 704/9 |
| 2012/0108259 | A1* | 5/2012 | Weiss | G06Q 30/0267 455/456.1 |
| 2012/0197714 | A1 | 8/2012 | Beyeler et al. | |
| 2013/0252638 | A1* | 9/2013 | Yang | H04W 4/029 455/456.3 |
| 2013/0262479 | A1* | 10/2013 | Liang | H04W 4/021 707/748 |
| 2016/0048756 | A1* | 2/2016 | Hall | G06F 16/248 706/20 |
| 2016/0050536 | A1* | 2/2016 | You | H04W 4/025 455/456.3 |
| 2017/0177723 | A1 | 6/2017 | Price et al. | |
| 2019/0163833 | A1 | 5/2019 | Auyoung et al. | |

OTHER PUBLICATIONS

"U.S. Appl. No. 15/993,313, Non Final Office Action dated May 27, 2020", 21 pgs.

"U.S. Appl. No. 15/993,313, Response filed Aug. 28, 2020 to Non Final Office Action dated May 27, 2020", 10 pgs.

"U.S. Appl. No. 15/993,313, Non Final Office Action dated Dec. 14, 2020", 28 pgs.

* cited by examiner

DETECTING ATTRIBUTE CHANGE FROM TRIP DATA

PRIORITY

This application claims the benefit of priority to U.S. Provisional Patent Application Ser. No. 62/591,555, entitled "DETECTING ATTRIBUTE CHANGE FROM TRIP DATA," filed on Nov. 28, 2017 which is hereby incorporated by reference in its entirety.

TECHNICAL FIELD

The subject matter disclosed herein generally relates to special-purpose machines that improve point of interest (POI) attribute data for a networked system, and to the technologies by which such special-purpose machines become improved compared to other similar special-purpose machines. Specifically, the present disclosure addresses systems and methods to manage a data storage by processing trip data in order to detect and verify changes in an attribute of the POI, such as name, address, latitude/longitude, or status (e.g. closed, moved, temporary).

BACKGROUND

Various systems maintain a catalog of places of interest (POI) that include a name, address, and in some cases, a geographic coordinate. A constant challenge in maintaining such a catalog is that the POI (e.g., business) may often close or move. In these situations, an update of the catalog is often slow to manifest or may never be updated.

BRIEF DESCRIPTION OF THE DRAWINGS

Some embodiments are illustrated by way of example and not limitation in the figures of the accompanying drawings.

DETAILED DESCRIPTION

Figure 1:
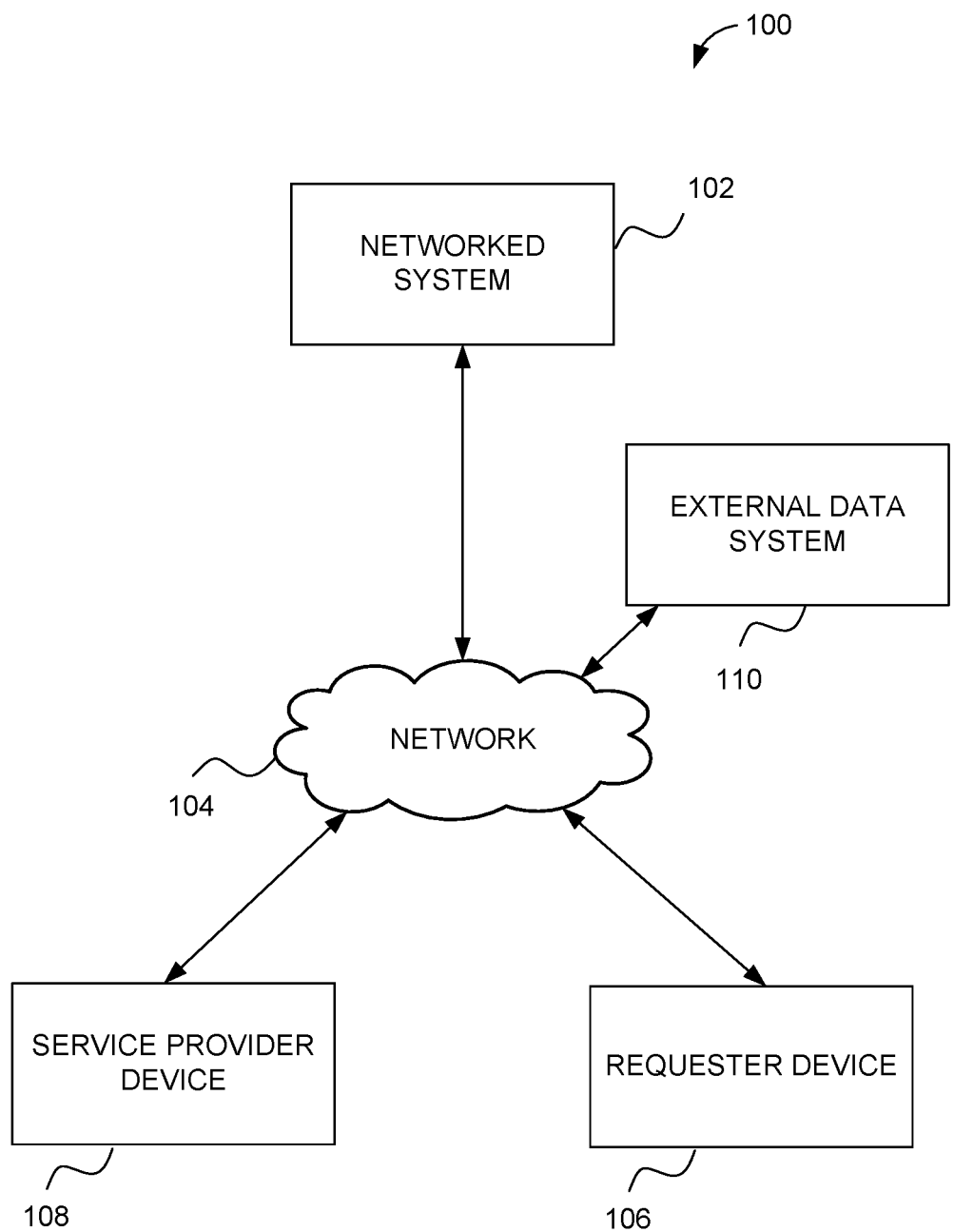
FIG. 1 is a diagram illustrating a network environment suitable for detecting and verifying an accurate attribute for moved, closed, or changed places from trip data, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for improving the accuracy of geographic position data and other relevant attributes, such as name or status. In example embodiments, a technical solution involves systems and methods that analyze, using clustering algorithms, trip data (also referred to "trip logs") in order to determine and verify an address or attributes for points of interest that may have moved or closed. In example embodiments, a networked system obtains and stores trip data. The stored trip data comprises information pertaining to a service provided between a pick-up location (PU) and a drop-off location (DO). The service may comprise a transportation service or a delivery service (e.g., food or goods delivery). In some embodiments, the networked system receives an indication of a possible address change for a point of interest (POI) associated with either a PU or DO. In other embodiments, the networked system periodically performs an analysis to determine if a POI has moved or if an attribute has changed. Using the trip data, the networked system generates, using the clustering algorithm, a first spatial cluster and a second spatial cluster based on coordinates indicated in the trip data for the POI. A centroid for the first spatial cluster and a centroid for the second spatial cluster is identified. The networked system then determines whether a difference in distance between the centroid for the first spatial cluster and the centroid for the second spatial cluster meets or transgresses a centroid distance threshold (e.g., 50 meters). That is, the networked system determines if the centroids are far enough apart to indicate that the POI has, for example, moved. In response to the determining, a database may be updated to indicate, for example, a new address for the POI, whereby the new address corresponds to a location associated with the spatial cluster having a more recent average timestamp. For example, the first spatial cluster corresponds to an original address for the POI and the second spatial cluster corresponds to a new address for the POI. If the distance between the centroids of these two spatial clusters exceed the centroid distance threshold, the networked system suspects that the POI has moved and the new address of the second spatial cluster is likely the most accurate. Alternatively, the determining may indicate that a change in attribute such as a new location (e.g., having a same name as an existing POI) is identified (e.g., a Starbucks two blocks from an existing Starbucks). That is the first spatial cluster corresponds to an original location for a business and the second spatial cluster corresponds to a second, new location for the business. In this embodiment, the original location may, additionally, be closed.

In some embodiments, a verification process is triggered to verify the new attribute (also referred to as a "changed attribute"), such as a new address prior to updating the database with the new attribute for the POI. The verification process, in some embodiments, comprises use of user generated content. In particular, a user interface is caused to be presented on a user device of a user that has an association with the POI. For example, the user may be a driver or a rider traveling from the POI (e.g., a PU) or to the POI (e.g., DO). The user interface presents a query regarding the new attribute (e.g., which address for the POI is most correct; is this a new location for XYZ business; did ABC business change its name; is an event at the POI temporary?). A response to the query from one or more users is then used to verify the new attribute.

Thus, example methods (e.g., algorithms) and example systems (e.g., special-purpose machines) are configured to improve the accuracy of the POI data. In particular, example embodiments provide mechanisms and logic that utilizes clustering algorithms, such as K-means clustering, applied to historical trip data associated with a POI in order to determine if an attribute of the POI has changed (e.g., moved, new location, temporary location) and to verify the new attribute. As a result, one or more of the methodologies described herein facilitate solving the technical problem of improving the accuracy of POI data, and more specifically improving accuracy of an attribute, such as an address, corresponding to the POI.

FIG. 1 is a diagram illustrating a network environment 100 suitable for improving accuracy of POI attribute data, according to some example embodiments. The network environment 100 includes a networked system 102 communicatively coupled via a network 104 to a requester device 106, a service provider device 108, and one or more external data systems 110. In example embodiments, the networked system 102 comprises components that obtain, store, and analyze trip data in order to determine a correct (or most likely correct address) for a POI that may have moved. The components of the networked system 102 is described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the requester device 106 and the service provider device 108 are portable electronic devices such as smartphones, tablet devices, wearable computing devices (e.g., smartwatches), or similar devices. Alternatively, the service provider device 108 can correspond to an on-board computing system of a vehicle. The requester device 106 and the service provider device 108 comprises one or more processors, memory, touch screen displays, wireless networking system (e.g., IEEE 802.11), cellular telephony support (e.g., LTE/GSM/UMTS/CDMA/HSDP A), and/or location determination capabilities. The requester device 106 and the service provider device 108 interact with the networked system 102 through client applications stored thereon. The client applications of the requester device 106 and the service provider device 108 allow for exchange of information with the networked system 102 via user interfaces. The client applications running on the requester device 106 and the service provider device 108 may also determine location information of the requester device 106 and the service provider device 108 (e.g., latitude and longitude for a PU or a DO of a trip), and provide the location information to the networked system 102 for storage as part of trip logs or trip data. The trip data are used by the networked system 102 to improve the accuracy of POI attribute data (e.g., addresses of POI; closed POI; new location; temporary location).

In example embodiments, a user operates the requester device 106 that executes the client application (e.g., not shown) to communicate with the networked system 102 to make a request for transport or delivery service (referred to collectively as a "trip"). In some embodiments, the client application determines or allows the user to specify a pick-up location (PU) (e.g., of the user or an item to be delivered) and to specify a drop-off location (DO) for the trip. For example, the PU or the DO may be an address or name of a location inputted by the user on a user interface provided via the client application, or the PU corresponds to a current location of the requester device 106 as automatically determined by a location determination module (not shown) in the requester device 106 (e.g., a global positioning system (GPS) component). In some embodiments, the networked system 102 recommends the PU or DO based on historical trip data associated with the user. In example embodiments, the client application provides a current location (e.g., coordinates such as latitude and longitude) of the requester device 106 to the networked system 102. The client application also presents information, from the networked system 102 via user interfaces, to the user of the requester device 106, such as address verification requests (e.g., query to verify a new address determined by the networked system 102).

A second user operates the service provider device 108 to execute a client application (not shown) that communicates with the networked system 102 to exchange information associated with providing transportation or delivery service to the user of the requester device 106. The client application presents information via user interfaces to the user of the service provider device 108, such as invitations to provide transportation or delivery service, navigation instructions, and attribute verification requests (e.g., query to verify a new address). The client application also provides a current location (e.g., coordinates such as latitude and longitude) of the service provider device 108 to the networked system 102, whereby the current location may comprise a PU or DO of a POI or any position in between. Depending on implementation, the current location may be a location corresponding to the current location of the service provider device 108 as determined automatically by a location determination module (not shown) in the provider client device 122. In example embodiments, the PU or the DO corresponds to an address for a POI and are associated with coordinates (e.g., latitude and longitude) based from either a location of the requester device 106 or the service provider device 108 when a trip starts and/or when the trip ends.

The external data system 110 comprises external data (e.g., public domain data external to the networked system 102) regarding POIs. The external data from the external data system 110 can be used (e.g., by an operator or machine of the networked system 102) to verify an attribute for a POI determined by the networked system 102. For example, the external data may correspond to a website of a business located at the POI that includes an address of the business. The address from the web site can be compared to a new address determined by the networked system 102 during a verification process. In another example, the external data may comprise a public directory (e.g., white pages) that indicates addresses or other attributes for POIs.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of service provider devices 108 or requester devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. While only a single networked system 102 is shown, alternative embodiments may contemplate having more than one networked systems 102 to perform server operations discussed herein for the networked system 102.

Figure 2:
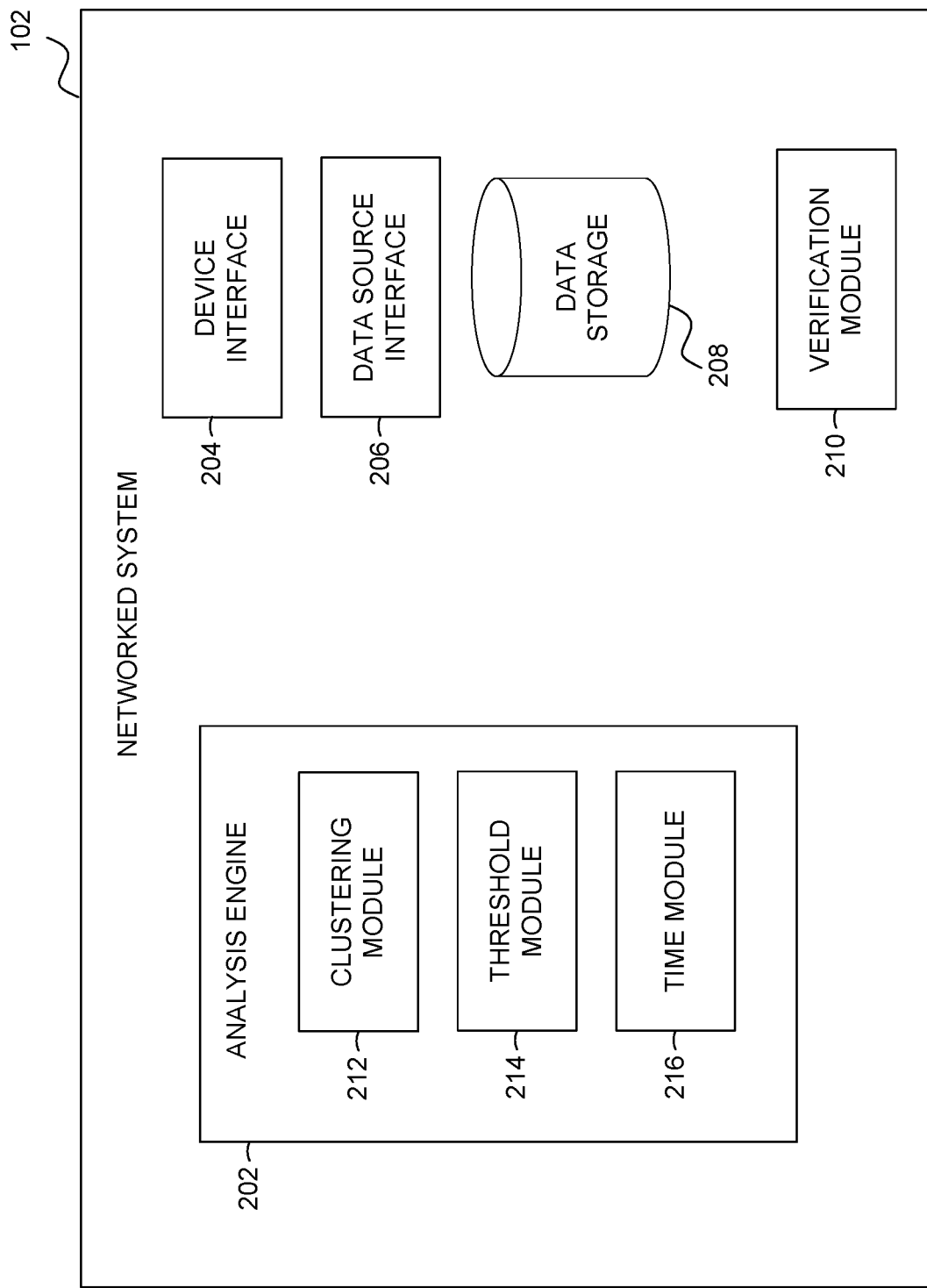
FIG. 2 is a block diagram illustrating components of a networked system, according to some example embodiments.

FIG. 2 is a block diagram illustrating components of the networked system 102, according to some example embodiments. In various embodiments, the networked system 102 obtains and stores trip data, detects a potential change in attribute for a POI, performs analysis to determine whether an attribute has changed for the POI, and updates data structures of a data storage if the attribute has changed. In some embodiments, the networked system 102 also performs a verification process to verify that a new or changed attribute determined by the networked system 102 is accurate. To enable these operations, the networked system 102 comprises an analysis engine 202, a device interface 204, a data source interface 206, a data storage 208, and a verification module 210 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 204 is configured to exchange data with the requester device 106 and the service provider device 108. For example, the device interface 204 receives requests for transport or delivery service from the requester device 106, sends invitations to provide the service to the service provider device 108, sends navigation instructions to the service provider device 108, and receives coordinates (e.g., latitude and longitude) from the requester device 106 or service provider devices 108 during a trip. The coordinates may correspond to a PU and a DO of the trip. Various information from the trip (e.g., coordinates, POI address, duration, cost, POI name) are stored to the data storage 208 as trip data. Additionally, the device interface 204 may transmit instructions to cause user interfaces to be displayed on the requester device 106 or service provider devices 108. The user interfaces may include a query regarding accuracy of an attribute associated with a POI, as will be discussed in more detail below.

The data source interface 206 is configured to exchange data with the external data system 110. In example embodiments, external data from the external data system 110 is accessed, via the data source interface 206, and used in a verification process, as will be discussed in more detail below.

The analysis engine 202 is configured to perform analysis on trip data to determine whether an attribute (e.g., location, name, or other information) has changed for a POI and to update data structures of the data storage 208 if the attribute has changed (e.g., if the POI is now closed or has moved). In some embodiments, the analysis engine 202 receives an indication that the POI may have moved or changed. The indication may be received from another component of the networked system 102 or a different networked system configured to detect that the POI may have moved or changed. For example, the indication may indicate that more than one address is linked to the same POI. The receipt of the indication triggers the analysis engine 202 to perform the analysis on the trip data to determine a most accurate address or other information for the POI. In alternative embodiments, the analysis engine 202 may periodically perform the analysis regardless of receiving the indication. The analysis is performed by components of the analysis engine 202 including a clustering module 212, a threshold module 214, and a time module 216.

The clustering module 212 is configured to generate spatial (location) clusters from trip data. Accordingly, the clustering module 212 accesses a plurality of trip data associated with the POI. For example, trip data may indicate that the POI was a DO of a trip or a PU of the trip. The trip data for a trip involving the POI (as either a PU or DO) comprises a triple that contains a set of data: latitude and longitude (also referred to herein as "coordinates") and a timestamp for the trip (e.g., time when the trip began or time when the trip is completed). Given this data, the clustering module 212 applies a clustering algorithm that takes spatial two-dimensional data (e.g., the coordinates) to generate the spatial clusters. In one embodiment, the clustering algorithm is a K means clustering algorithm with K=2 (e.g., the number of clusters set to two clusters in embodiments where two different addresses may be linked to the POI). In some embodiments, the clustering module 212 uses coordinates of the DO when the DO is the POI in performing the clustering. Typically, the coordinates of a DO correspond closely to a final destination (e.g., address of the POI) that a user wants to be dropped off at or an item delivered to. However, coordinates of a pick-up location associated with a POI may be less exact. This may be due to the user or item being picked up in a convenient location near the POI but not exactly at the POI. However, in other embodiments, the clustering module 212 uses coordinates for cases where the POI is both the DO or PU. While example embodiments generate two spatial clusters using the clustering algorithm, alternative embodiments may contemplate using any number of spatial clusters more than one.

The clustering module 212 also determines, for each generated cluster, a centroid of each spatial cluster. In example embodiments, the centroid is an averaged point/location within the spatial cluster. The averaged point/location is an average of the latitudes and longitudes of locations within the respective spatial cluster.

The threshold module 214 is configured to determine whether the centroids of the two spatial clusters satisfy a centroid distance threshold that would indicate that the centroids are located a significant distance apart to indicate a change in attribute (e.g., a change in a physical address). For example, the POI may be large enough to have multiple exits from which a user may be picked up (e.g., a mall, a stadium). In some cases, the clusters may be located at exits on opposite sides of the same POI. Therefore, the threshold module 214 attempts to take these situations into consideration. Thus, if the threshold module 214 determines that a distance between the centroids of the two clusters is equal to or greater than the centroid distance threshold (e.g., 50 meters, 100 meters), then the threshold module 214 concludes that the two clusters are far enough apart to signify that a change in address may have occurred or that a new location (e.g., having a same name as an original POI) has opened.

The time module 216 is configured to manage time analysis. By using the time analysis to complement the spatial analysis discussed above, false positives from a large candidate set may be reduced. In example embodiments, the time module 216 determine an average time for each spatial cluster based on timestamps for each trip from the trip data associated with each spatial cluster. Using the average time, the time module 216 determines whether a difference between the average time for the first spatial cluster and the average time for the second spatial cluster meets or transgresses a time threshold (e.g., greater than a week, a month, 2 months, 3 months). That is, the time module 216 determines whether the time difference is far enough part to signify that an attribute for the POI has changed. If the time difference meets or exceeds the time threshold, then the time module 216 updates the data storage with the attribute associated with the spatial cluster that is more recent. Alternatively or additionally, the time module 216 may trigger a verification process performed by the verification module 210. While average time is discussed above, example embodiments may use other time metrics such as median time or percentile of time.

In an alternative embodiment, the time module 216 determines at least two time buckets. For example, the time module 216 creates a first bucket of trips for last month and a second bucket of trips for a current month. Based on the buckets, the clustering module 212 generates a first spatial cluster for the first bucket and generates a second spatial cluster for the second bucket and identifies the centroids of the two spatial clusters. The threshold module 214 then determines whether the centroids of the two spatial clusters satisfy a centroid distance threshold that would indicate that the centroids are located a significant distance apart to indicate a change or update in location(s) or its properties.

In further embodiments, the time module 216 is configured to manage a time series analysis to determine whether the POI is closed. In example embodiments, the time module 216 performs time series analysis of how many trips have occurred to/from the POI and predicts (e.g., time series prediction or estimation) when a number of trips (e.g., trip count) will reach zero or a low threshold. Because, the trip data indicates, for each trip, a timestamp and the PU or DO, the time module 216 creates time buckets based on the timestamps. The time module 216 examines trip counts for the POI for each time bucket and attempts (e.g., using a machine learning algorithm) to determine a trend based on the trip data that predicts when the number of trips is estimated to reach a low or almost zero threshold. In one embodiment, the machine learning algorithm used is the Markoff chain algorithm (e.g., by volume of drop off both as a relative volume decrease and aggregate volume decrease). If the number of trips reach the low or almost zero threshold, then the time module 216 determines that the POI is likely closed (or is a temporary event or POI).

Figure 6A:
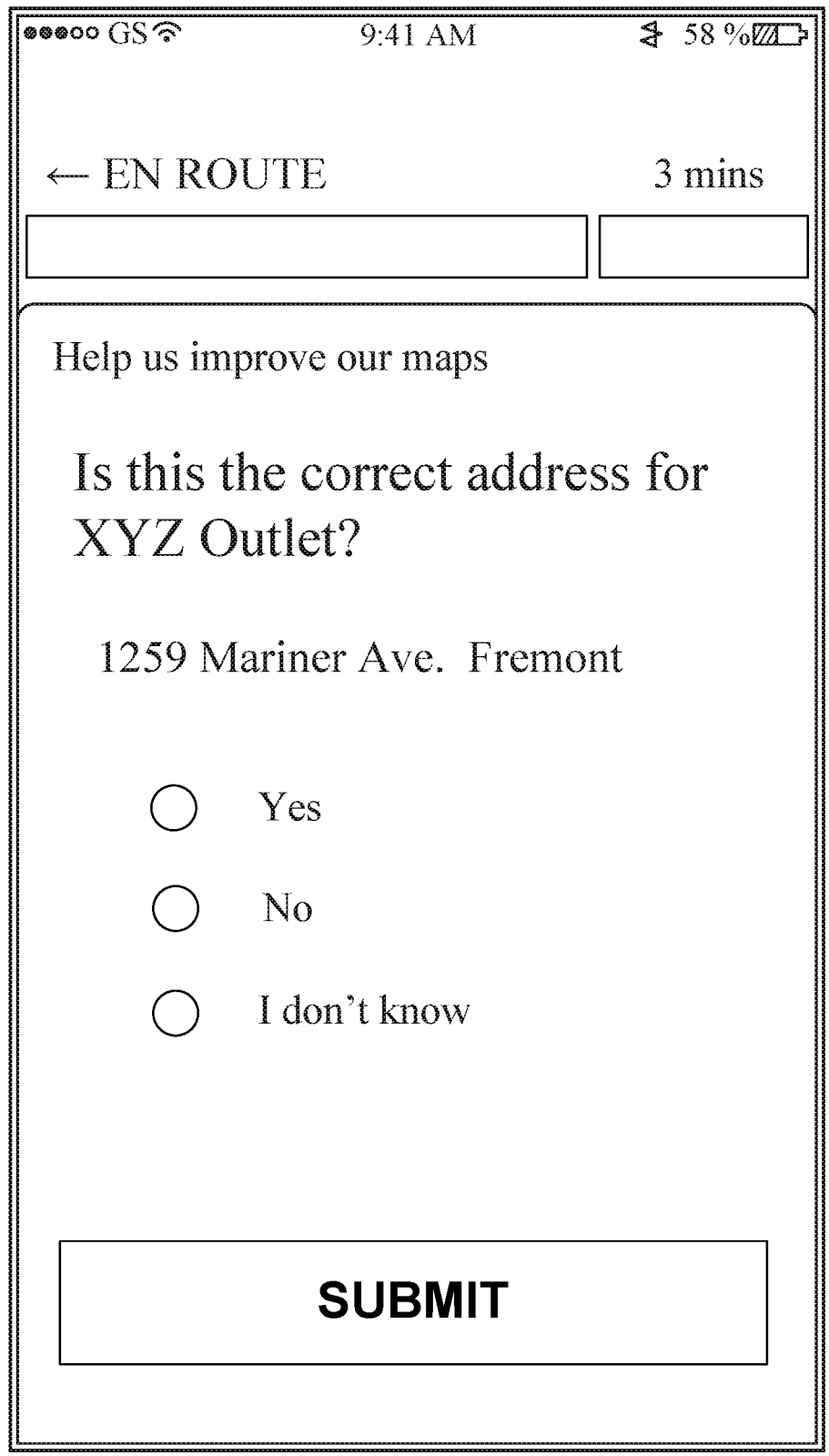
FIGS. 6A and 6B are example user interfaces used to illicit user generated content for verification of an attribute for a place.
Figure 6B:
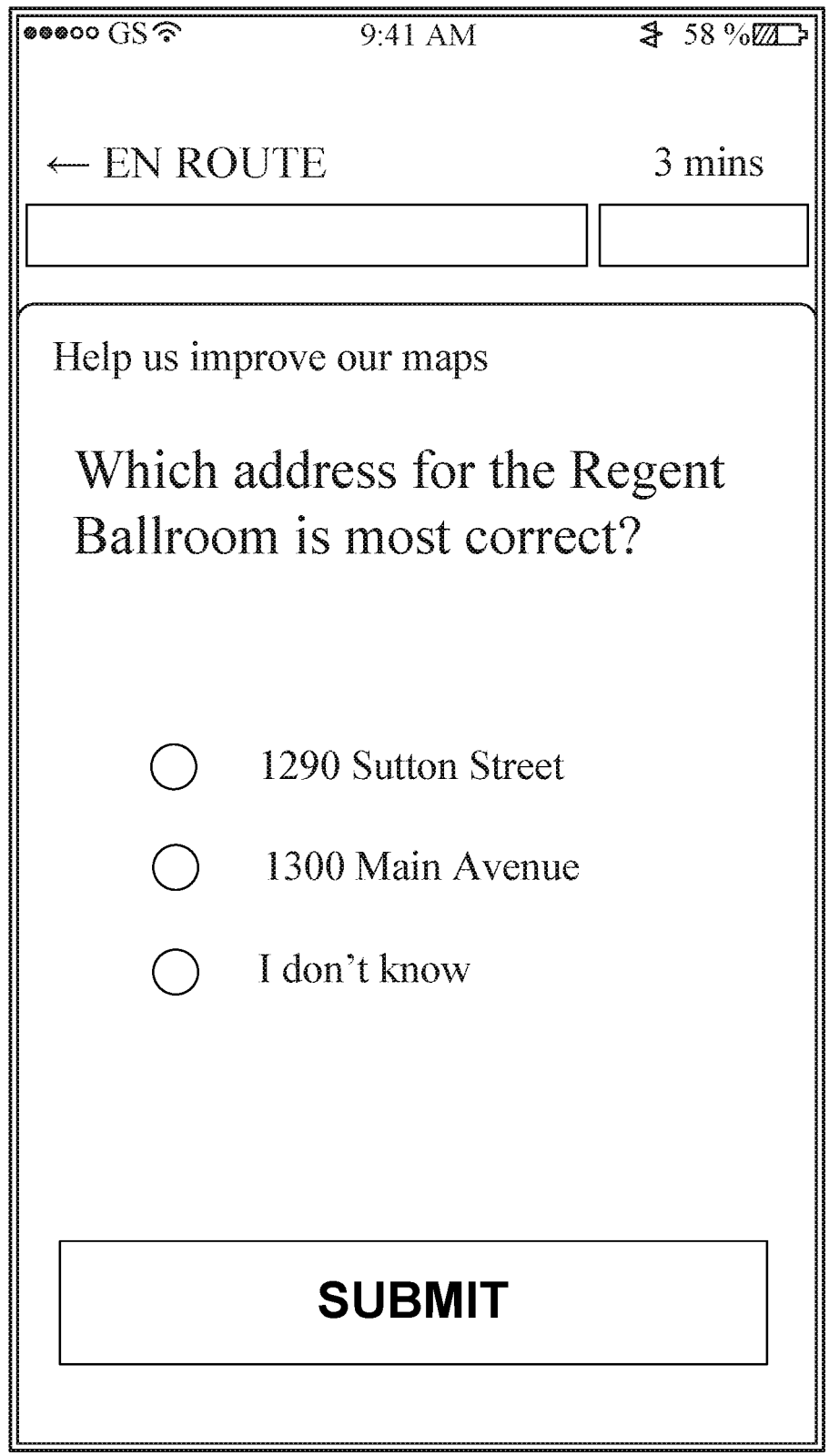
Figure 6C:
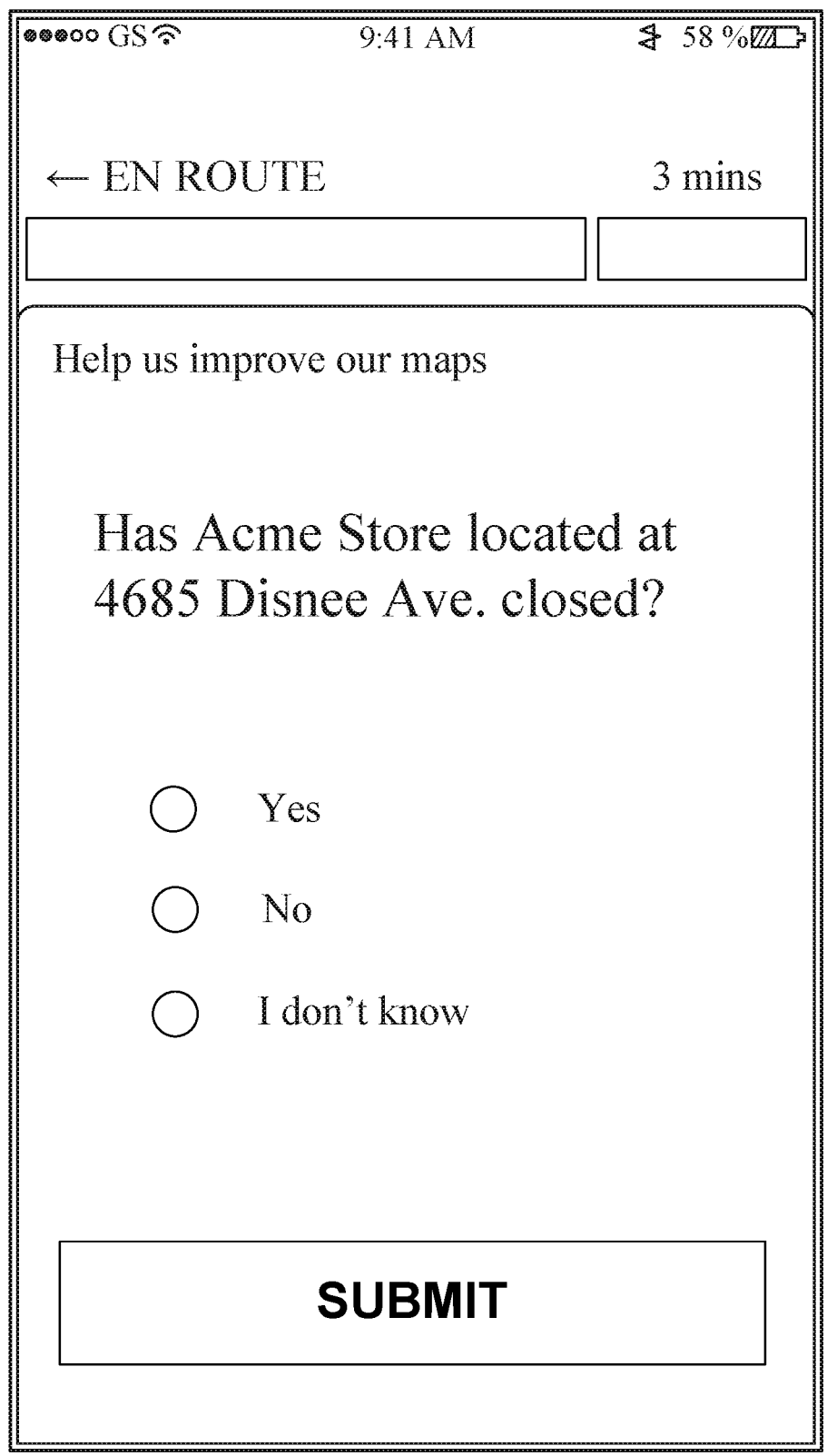
FIG. 6C is an example user interface used to illicit user generated content for verification that a POI has closed.

The verification module 210 is configured to manage a verification process (e.g., in response to the threshold module 214 and the time module 216 determining that the centroid distance threshold and the time threshold are met or transgressed). The verification process verifies a new or changed attribute for the POI (e.g., a most recent address based on timestamps and the time metrics (e.g., average times) associated with the spatial clusters or time buckets) or verifies whether a POI is closed. In some embodiment, the verification module 210 triggers presentation of user interfaces to obtain user generated content. Specifically, the verification module 210 generates or causes the generation of a user interface that requests a user associated with the POI to verify the new or changed attribute for the POI. For example, the user may be an individual operating a requester device that is traveling to the POI. A response from the requester device or service provider device, via the device interface 204, is received and used to verify the attribute by the verification module 210. Examples of user interfaces for verifying the attribute are shown in FIG. 6A and FIG. 6B, and a user interface for verifying that a POI is closed is shown in FIG. 6C.

In some embodiments, the verification module 210 transmits the attribute to an operator system, whereby an operator of the operator system verifies the attribute or verifies whether the POI is closed (e.g., using the external data obtained via the data source interface 206). The external data may comprise any public domain data such as a website linked to the POI.

Figure 3:
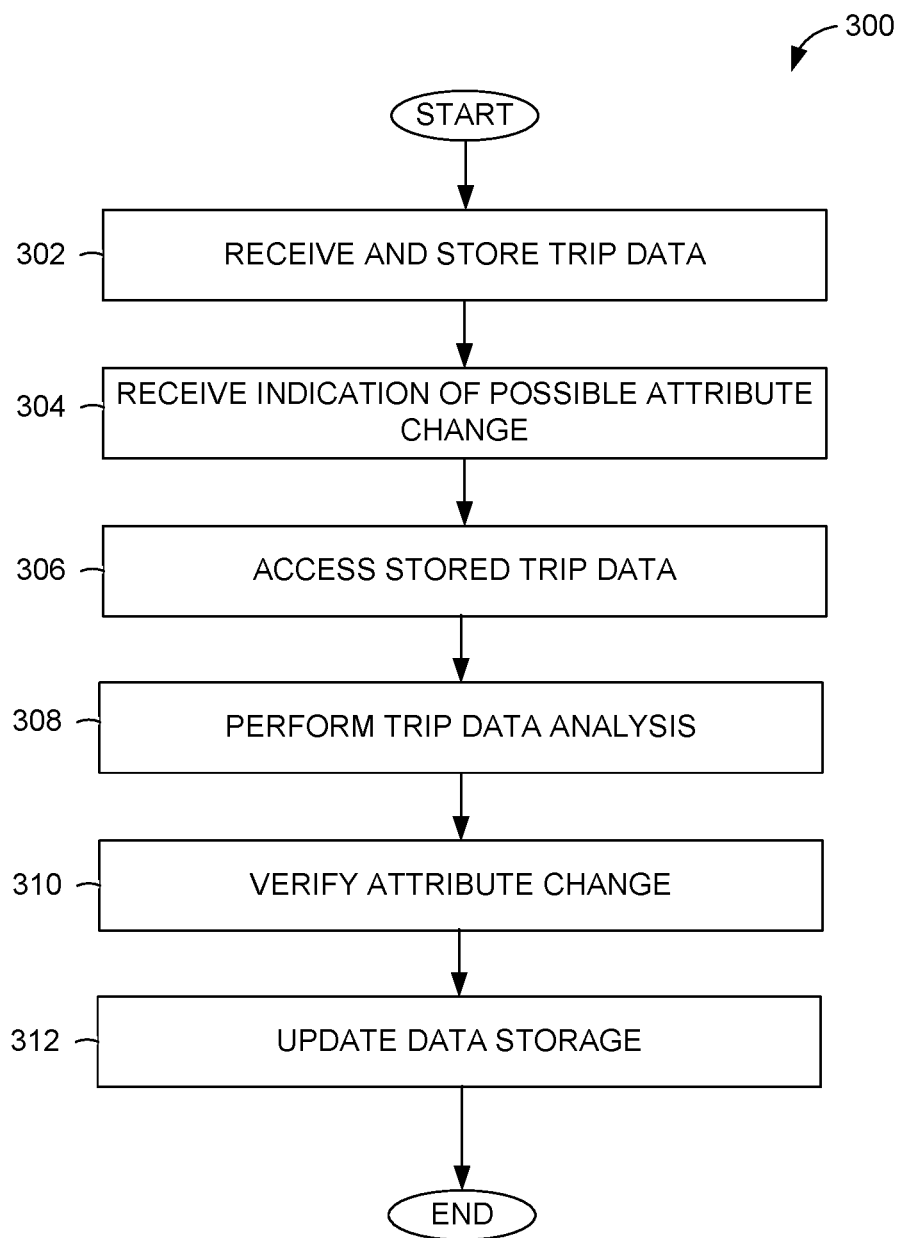
FIG. 3 is a flowchart illustrating operations of a method for detecting and verifying an accurate attribute for places from trip data, according to some example embodiments.

FIG. 3 is a flowchart illustrating operations of a method 300 for detecting and verifying a changed or updated attribute associated with a POI, according to some example embodiments. Operations in the method 300 may be performed by the networked system 102, using components described above with respect to FIG. 2. Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, trip data is received and stored in the data storage 208 (e.g., as trip logs). In example embodiments, the device interface 204 receives coordinates (e.g., latitude and longitude) from the requester device 106 or service provider device 108 indicating a potential trip (e.g., in a trip request) as well as during a trip (e.g., when a pick-up occurs and when the trip is completed). The coordinates may correspond to a POI that is a PU, DO, or a location when a service is requested. Additionally, other trip data from the trip (e.g., time, duration, cost, length of trip, route taken) are received. The received trip data for the trip is stored to the data storage 208 as a trip log. The trip data may be received and stored as trip logs at any time.

In operation 304, an indication of possible attribute change for a POI is received by the analysis engine 202. The indication may be received from another component of the networked system 102 or a different networked system configured to detect that the POI may have moved or changed. For example, the indication may indicate that more than one address is linked to the same POI. In some embodiments, operation 304 is optional.

In some embodiments, the receipt of the indication of possible address change for the POI triggers the analysis engine 202 to perform the analysis on the trip data to determine a most accurate attribute for the POI. In other embodiments, the analysis engine 202 may periodically perform the analysis or performs the analysis based on an event trigger (e.g., detects two different addresses for same POI in data storage 208). As such in operation 306, the stored trip data associated with the POI is accessed by the clustering module 212. The accessed trip data may indicate that the POI was either a DO of a trip or a PU of the trip, and, in some cases, includes an address for the POI. Additionally, the trip data may indicate a request location from where the user requests the service. Furthermore, the trip data for a trip involving the POI comprises a triple that contains coordinates (e.g., latitude and longitude) and a timestamp for the trip (e.g., time when the trip began or time when the trip is completed).

In operation 308, trip data analysis is performed by the analysis engine 202. The trip data analysis results in identifying an attribute that is new or changed for the POI. Operation 308 will be discussed in more detail in connection with FIG. 4A and FIG. 4B below.

In operation 310, the attribute identified in operation 308 is verified. In example embodiments, the verification module 210 is configured to manage the verification process. In some embodiment, the verification module 210 triggers presentation of user interfaces to obtain user generated content. In some cases, the verification module 210 generates or causes the generation of a user interface that requests a user traveling to or from the POI to verify the attribute for the POI. For example, the user may be an individual operating a service provider device that is traveling to the POI. Examples of user interfaces for verifying the attribute are shown in FIG. 6A and FIG. 6B. A response from the requester device or service provider device (e.g., user generated content), via the device interface 204, is received and used to verify the attribute by the verification module 210. In some embodiments, the verification module 210 transmits the attribute to an operator system, whereby an operator (e.g., human or machine operator) of the operator system verifies the attribute (e.g., using the external data obtained via the data source interface 206). Further still, the attribute may be verified using both user generated content and the operator. In some embodiments, operation 310 is optional or not needed.

In operation 312, the data storage 208 is updated with the attribute. In some embodiments, the update is in response to the verification process verifying the attribute. For example, data structures of the data storage 208 may be updated by the verification module 210, a component of the analysis engine 202, or another component (not shown) of the networked system 102 with the address.

Figure 4A:
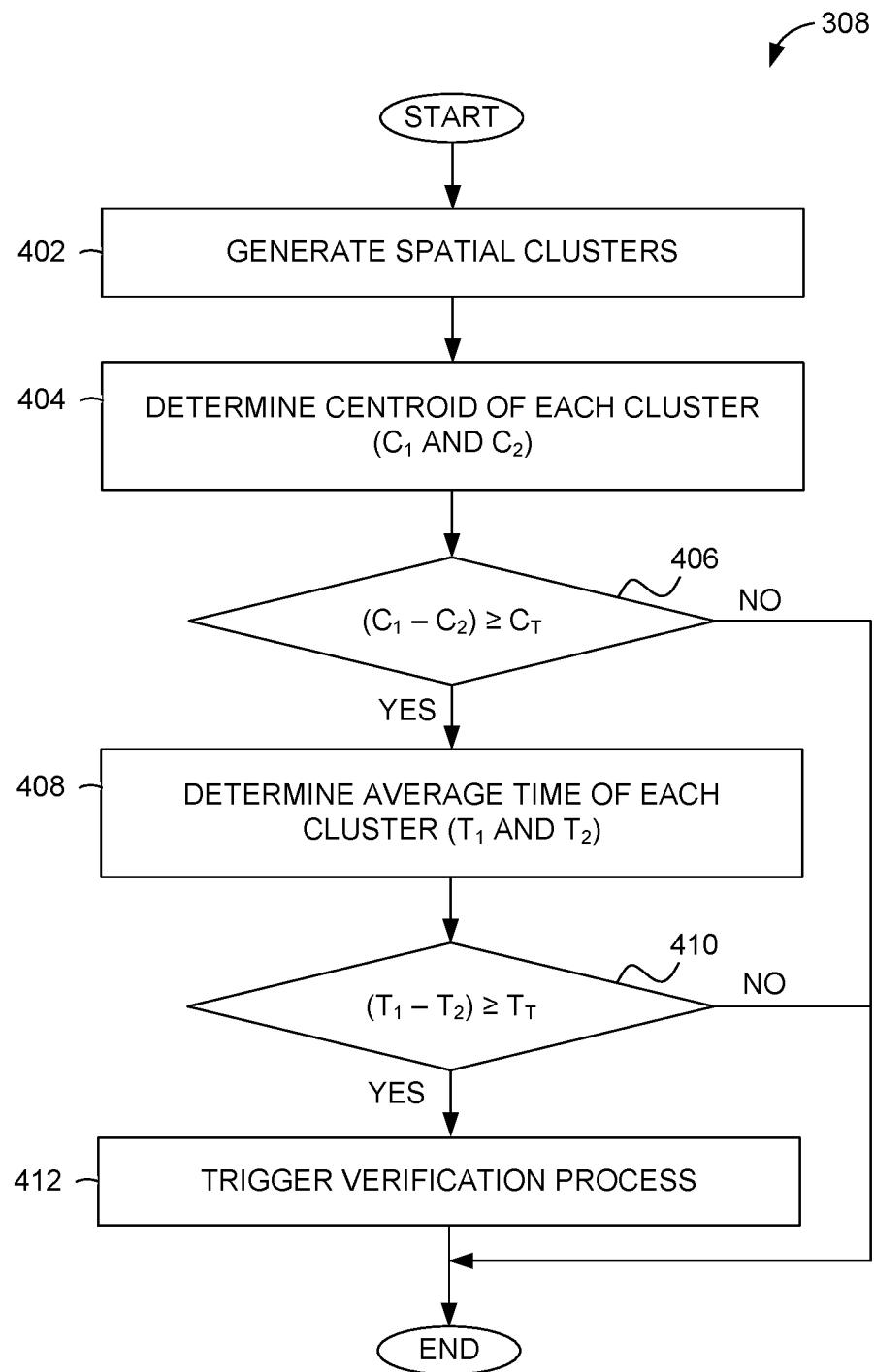
FIG. 4A is a flowchart illustrating operations of a method for performing trip data analysis to detect whether a place has a changed attribute, according to some example embodiments.

FIG. 4A is a flowchart illustrating operations of a method (e.g., operation 308) for performing trip data analysis to detect whether an attribute of a place (POI) has changed or is new according to some example embodiments. Operations in the method may be performed by the networked system 102, using components described above with respect to FIG. 2. Accordingly, the method is described by way of example with reference to the networked system 102. However, it shall be appreciated that at least some of the operations of the method may be deployed on various other hardware configurations or be performed by similar components residing elsewhere in the network environment 100. Therefore, the method is not intended to be limited to the networked system 102.

In operation 402, a first spatial cluster and a second spatial cluster are generated. In example embodiments, the clustering module 212 applies a clustering algorithm that takes spatial two-dimensional data (e.g., the coordinates for the POI from trip data) to generate the spatial clusters. In one embodiment, the clustering algorithm is a K means clustering algorithm with K=2 (e.g., the number of clusters set to two clusters in embodiments where two addresses may be linked to the POI). While example embodiments discuss generating two spatial clusters using the clustering algorithm, alternative embodiments may contemplate using any number of spatial clusters more than one.

In operation 404, a centroid for each of the spatial clusters ($C_1$ and $C_2$) is determined by the clustering module 212. In example embodiments, the centroid is an averaged point/location within the spatial cluster. Therefore, the clustering module 212 determines an average of the latitudes and longitudes of the locations within the respective spatial cluster. Thus, $C_1$ is an average location based on the latitudes and longitudes of the locations within the first spatial cluster, and $C_2$ is an average location based on the latitudes and longitudes of the locations within the second spatial cluster.

In operation 406, a determination is made as to whether a distance between the two centroids ($C_1$-$C_2$) meets or transgress a centroid distance threshold ($C_T$). In example embodiments, the threshold module 214 is configured to determine whether the centroids of the two spatial clusters satisfy the centroid distance threshold that would indicate that the centroids are located a significant distance apart to indicate a change in location (e.g., a change in a physical address). If the threshold module 214 determines that the distance between the centroids of the two spatial clusters ($C_1$ and $C_2$) is less than the centroid distance threshold ($C_T$), then the method ends.

If in operation 406, the difference between the two centroids ($C_1$-$C_2$) meets or transgress the centroid distance threshold ($C_T$), a time metric (e.g., average time, median time, percentile of time) for each cluster ($T_1$ and $T_2$) is determined by the time module 216 in operation 408. In one embodiment, the time module 216 determine an average time for each spatial cluster based on timestamps for each trip from the trip logs associated with each spatial cluster. For example, $T_1$ is an average time based on the timestamps for trips associated with the first spatial cluster, and $T_2$ is an average time based on the timestamps for trips associated with the second spatial cluster.

In operation 410, a determination is made by threshold module as to whether a difference between the two time metrics ($T_1$-$T_2$) meet or transgress a time threshold ($T_T$). Using the time metrics, the time module 216 determines whether the difference between the time metric for the first spatial cluster and the time metric for the second spatial cluster meets or transgresses a time threshold. If the difference is less than the time threshold, then the method ends.

If in operation 410, the difference between the two time metrics ($T_1$-$T_2$) meets or transgress the time threshold ($T_T$), a verification process is triggered in operation 412 by the time module 216 resulting in operation 310. In some embodiments, operations 410 and 412 are optional or not needed. While average time is discussed above as an example, any form of a time metric may be used.

Figure 4B:
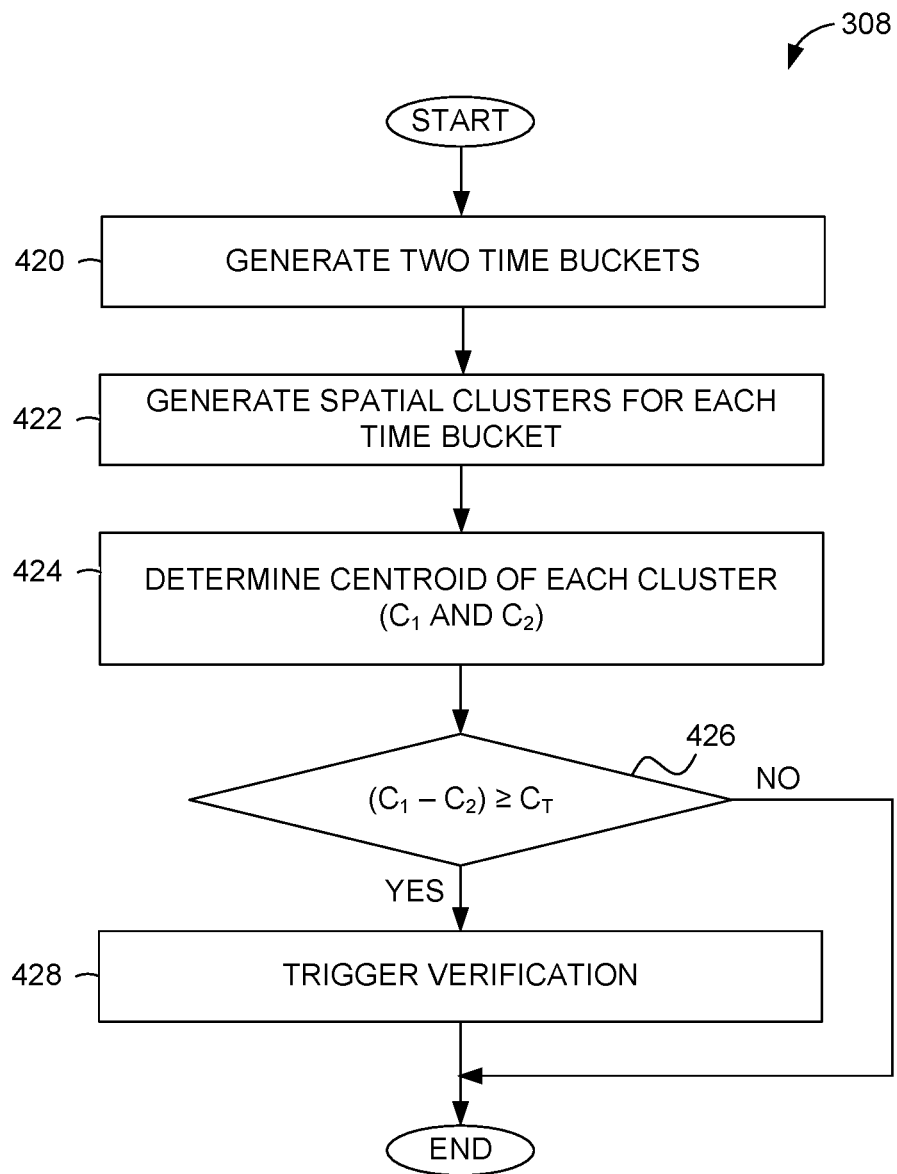
FIG. 4B is a flowchart illustrating operations of an alternative method for performing trip data analysis to detect whether a place has a changed attribute, according to some example embodiments.

FIG. 4B is a flowchart illustrating operations of an alternative method (e.g., operation 308) for performing trip data analysis to detect whether an attribute of a POI is new or has changed, according to some example embodiments. Operations in the method may be performed by the networked system 102, using components described above with respect to FIG. 2. Accordingly, the method is described by way of example with reference to the networked system 102. However, it shall be appreciated that at least some of the operations of the method may be deployed on various other hardware configurations or be performed by similar components residing elsewhere in the network environment 100. Therefore, the method is not intended to be limited to the networked system 102.

In operation 420, the time module 216 determines at least two time buckets (e.g., time periods). For example, the time module 216 creates a first time bucket covering last month and a second time bucket covering a current month.

In operation 422, spatial clusters for each time bucket is generated by the clustering module 212. For example, the clustering module 212 generates a first spatial cluster for the first time bucket using coordinates of trips that took place for the POI during a time period of the first time bucket. Similarly, the clustering module 212 generates a second spatial cluster for the second time bucket using coordinates of trips that took place for the POI during a time period of the first time bucket.

In operation 424, a centroid for each of the spatial clusters ($C_1$ and $C_2$) is determined by the clustering module 212. Operation 424 may be performed in a same manner as operation 404 described above.

In operation 426, a determination is made as to whether a distance between the two centroids ($C_1$-$C_2$) meets or transgress a centroid distance threshold ($C_T$). Operation 426 may be performed in a same manner as operation 406 described above. If the threshold module 214 determines that the distance between the centroids of the two spatial clusters ($C_1$ and $C_2$) is less than the centroid distance threshold ($C_T$), then the method ends.

If in operation 426, the difference between the two centroids ($C_1$-$C_2$) meets or transgress the centroid distance threshold ($C_T$), a verification process is triggered in operation 428 (e.g., by the time module 216 or threshold module 214) resulting in operation 310. In some embodiments, operations 426 and 428 are optional or not needed.

Figure 5:
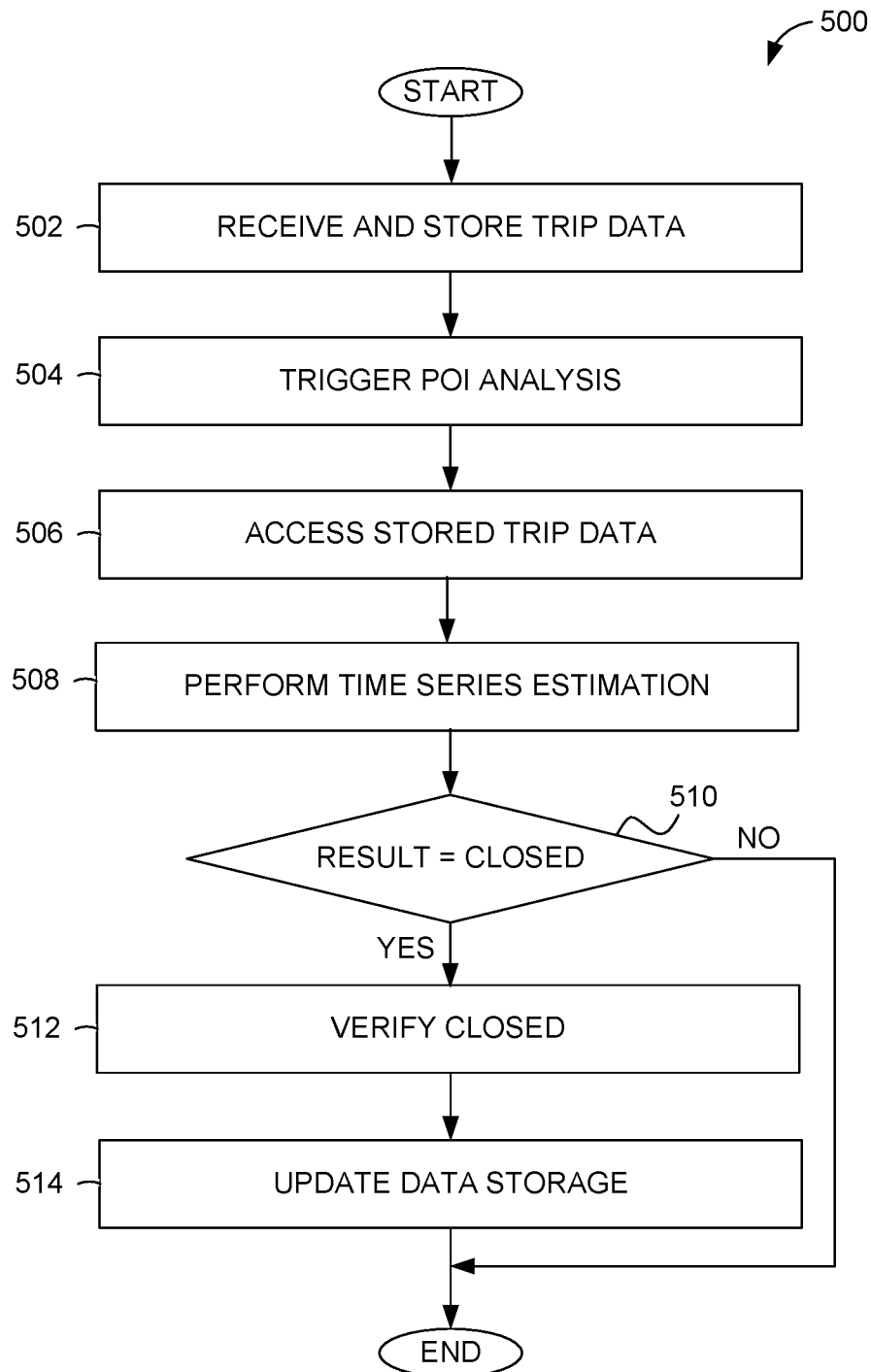
FIG. 5 is a flowchart illustrating operations for detecting and verifying closed places from trip data, according to some example embodiments.

FIG. 5 is a flowchart illustrating operations of a method 500 for detecting and verifying closed places or temporary places from trip data, according to some example embodiments. Operations in the method 500 may be performed by the networked system 102, using components described above with respect to FIG. 2. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In operation 502, trip data is received and stored as trip logs. In example embodiments, the device interface 204 receives coordinates (e.g., latitude and longitude) from the requester device 106 or service provider devices 108 indicating a potential trip (e.g., in a trip request) as well as during a trip (e.g., when a pick-up occurs and when the trip is completed). The coordinates may correspond to a POI that is a PU, DO, or location when a service is request. Additionally, other trip data from the trip (e.g., time, duration, cost, length of trip, route taken) are received. The received trip data for the trip is stored to the data storage 208 as a trip log. The trip data may be received and stored as trip logs at any time.

In operation 504, a closed or temporary POI analysis is triggered. In one embodiment, the analysis engine 302 receives an indication (e.g., from a device of an operator) to perform the POI analysis. In alternative embodiments, the analysis engine 302 may periodically perform the POI analysis or perform the POI analysis based on a triggering event indicating a POI as potentially be closed.

In operation 506, the stored trip data associated with the POI is accessed by the clustering module 212. The accessed trip data indicates, for each trip, that the POI was either a DO of a trip or a PU of the trip (or a location when a service is requested) and, in some cases, includes an address for the POI. Furthermore, the trip data for a trip involving the POI comprises a triple that contains coordinates (e.g., latitude and longitude) and a timestamp for the trip (e.g., time when the trip began or time when the trip is completed).

In operation 508, time series analysis and estimation is performed by the time module 216 for the POI. In example embodiments, the time module 216 performs time series analysis of how many trips have occurred to/from the POI and predicts (e.g., time series prediction or estimation) when the number of trips will reach zero (or almost zero) or below a threshold value. For example, the trip data indicates, for each trip, a timestamp and the PU, DO, or other location. Based on the trip data, time buckets are created by the time module 508 (e.g., weekly buckets—week1 bucket, week2 bucket, week3 bucket; or monthly buckets). The time module 216 examines trip counts for the POI for each time bucket and determines whether the trip counts show a decline that indicates that the POI is likely closed. Any algorithm that can take a set of data (e.g., trip data) and a given time parameter (e.g., equally spaced in time in weekly buckets) to perform time series analysis may be used by the time module 216. In one embodiment, the algorithm attempts to determine a trend based on the trip logs that predicts when the number of trips is estimated to reach or exceed the threshold value (e.g., a low or almost zero threshold). In some cases, the trends may indicate that the POI is only active for a particular period of time (e.g., 2 months over the summer every year). This may indicate that the POI is a temporary location, venue, or event (e.g., a festival, a fair). In one embodiment, the algorithm used is a Markoff chain algorithm.

If the time module 216 determines that, based on the algorithm, the number of trips have reached or exceeded the threshold (e.g., the low or almost zero threshold), then the time module 216 determines that the POI is likely closed in operation 510. For example, if the DO or PU are going way down for the POI, the time module 216 infers that the POI may have closed. However, because the POI may be a seasonal/temporary location that closes part of the year, the analysis may be performed over a long timeframe (e.g., one year, two years) to take seasonal adjustments into consideration. In an alternative embodiment, instead of determining that the number of trips have reached the low or almost zero threshold, the timing module 216 may determine if the number of trips (e.g., from PU or to DO for the POI) drops off a standard deviation in comparison to a previous number of time buckets (e.g., below a previous four weeks) or if the percentage change over a period of time exceeds a percentage threshold (e.g., drops more than 50% over three months).

If in operation 510, the time module 216 determines that the POI is likely closed, a verification process is triggered in operation 512 by the time module 216. In example embodiments, the verification module 210 is configured to manage the verification process. In some embodiment, the verification module 210 triggers presentation of user interfaces to obtain user generated content. In some cases, the verification module 210 generates or causes the generation of a user interface that requests a user to verify whether the POI is closed. An example of a user interface for verifying that a POI is closed is shown in FIG. 6C. A response from the requester device or service provider device (e.g., user generated content), via the device interface 204, is received and used to verify whether the POI is closed. In some embodiments, the verification module 210 transmits an indication that the POI may be closed to an operator system, whereby an operator (e.g., human or machine operator) of the operator system verifies whether the POI is closed (e.g., using the external data obtained via the data source interface 206). Further still, whether the POI is closed may be verified using both user generated content and the operator. In some embodiments, operation 512 is optional or not needed.

In operation 514, the data storage 208 is updated to indicate the POI is closed. In some embodiments, the update occurs in response to the verification process verifying the POI is closed. Accordingly, data structures of the data storage 208 may be updated by the verification module 210, a component of the analysis engine 202, or another component (not shown) of the networked system 102 to indicate the closure.

FIGS. 6A and 6B are example user interfaces used to illicit user generated content for verification of an attribute (e.g., address) for a POI. For example, if the networked system 102 (e.g., the verification module 210) detects that a user (e.g., a user at a requester device) entered that they are going to a POI (e.g., by entering the name of the POI or an address) and the user provides the address that is the attribute being verified, the networked system 102 provides a user interface to query the user whether the POI has moved or if the address is correct for the POI.

FIG. 6C is an example user interface used to illicit user generated content for verification that a POI has closed. The user interface of FIG. 6C may be provided to a user (e.g., a user at a requester device) that, for examples, has previously had a trip to the POI.

Figure 7:
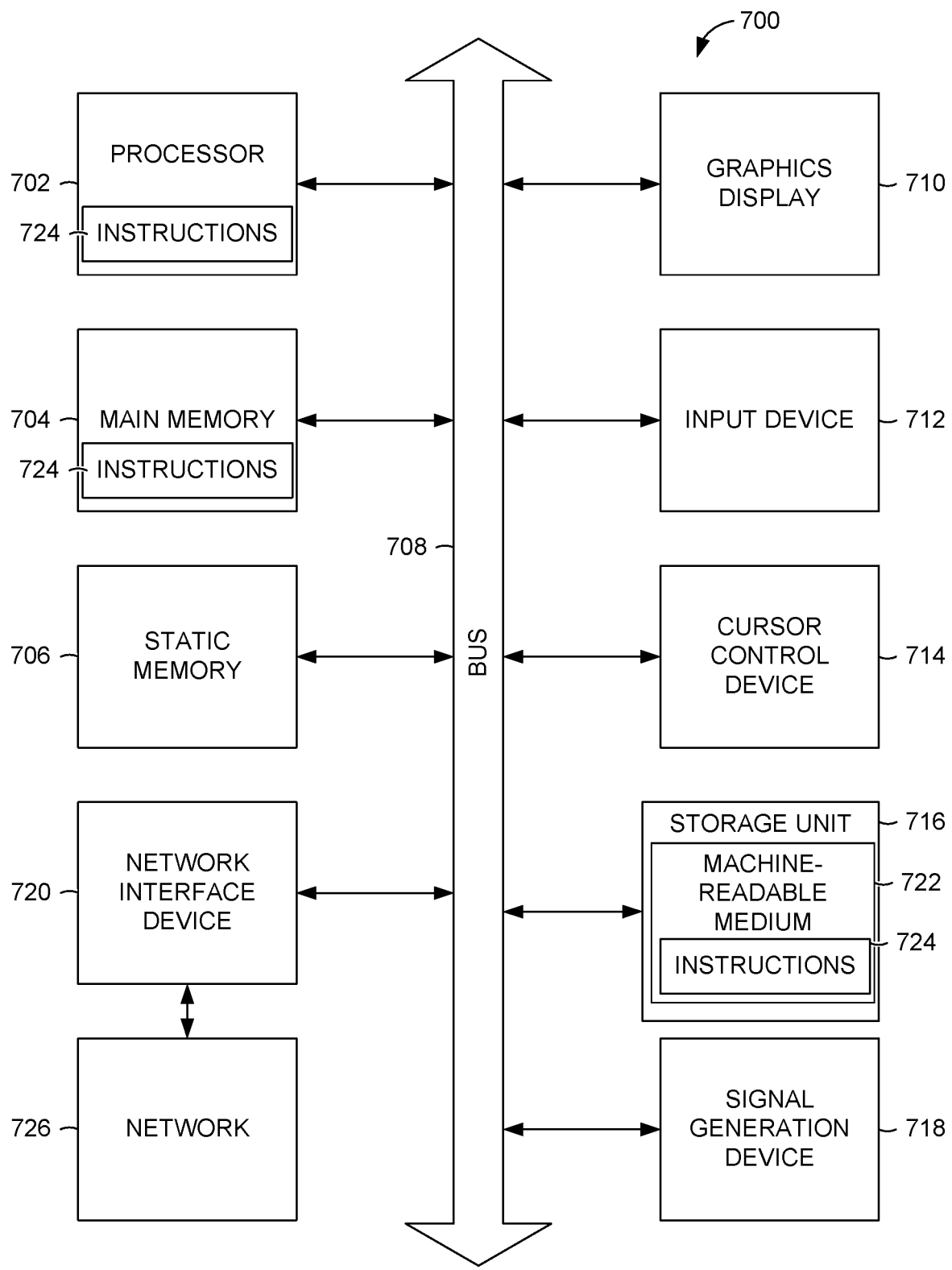
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 3-5. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 (e.g., a tangible machine-readable storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a system for improving attribute data of a point of interest (POI). The system includes one or more processors and a memory storing instructions that, when executed by the one or more hardware processors, causes the one or more hardware processors to perform operations comprising accessing trip data associated with the POI; generating, using a processor-implemented clustering algorithm, a first spatial cluster and a second spatial cluster using coordinates corresponding to the POI indicated in the trip data; identifying a centroid for the first spatial cluster and a centroid for the second spatial cluster; determining that a difference in distance between the centroid for the first spatial cluster and the centroid for the second spatial cluster meets or transgresses a centroid distance threshold; and in response to the determining, updating a database to indicate a new attribute for the POI, the new attribute corresponding to an attribute associated with either the first spatial cluster or the second spatial cluster.

In example 2, the subject matter of example 1 can optionally include in response to the determining, triggering a verification process to verify the new attribute is accurate.

In example 3, the subject matter of examples 1-2 can optionally include wherein the verification process comprises causing a user interface to be presented on a user device of a user that has an association with the POI, the user interface presenting a query regarding verifying the new attribute; receiving a response to the query via the user interface from the user device; and using the response to verify the new attribute.

In example 4, the subject matter of examples 1-3 can optionally include based on timestamps from the trip data, determining a time metric for the first spatial cluster and a time metric for the second spatial cluster; and determining that a difference between the time metric for the first spatial cluster and the time metric for the second spatial cluster meets or transgresses a time threshold, wherein the updating the database occurs further in response to the difference between the time metric for the first spatial cluster and the time metric for the second spatial cluster meeting or transgressing the time threshold.

In example 5, the subject matter of examples 1-4 can optionally include wherein the generating the first spatial cluster and the second spatial cluster comprises generating the first spatial cluster based on a first time period and the second spatial cluster based on a second time period.

In example 6, the subject matter of examples 1-5 can optionally include wherein the clustering algorithm comprises K means clustering algorithm.

In example 7, the subject matter of examples 1-6 can optionally include wherein the coordinates comprise a latitude and a longitude for the POI and the centroid for the first spatial cluster is an average point of the latitude and longitude for the POI in the first spatial cluster and the centroid for the second spatial cluster is an average point of the latitude and longitude for the POI in the second spatial cluster.

Example 8 is a method for improving attribute data for a point of interest (POI). The method comprises accessing trip data associated with the POI; generating, by a processor and using a processor-implemented clustering algorithm, a first spatial cluster and a second spatial cluster using coordinates corresponding to the POI indicated in the trip data; identifying a centroid for the first spatial cluster and a centroid for the second spatial cluster; determining that a difference in distance between the centroid for the first spatial cluster and the centroid for the second spatial cluster meets or transgresses a centroid distance threshold; and in response to the determining, updating a database to indicate a new attribute for the POI, the new attribute corresponding to an attribute associated with either the first spatial cluster or the second spatial cluster.

In example 9, the subject matter of example 8 can optionally include in response to the determining, triggering a verification process to verify the new attribute is accurate.

In example 10, the subject matter of examples 8-9 can optionally include wherein the verification process comprises causing a user interface to be presented on a user device of a user that has an association with the POI, the user interface presenting a query regarding verifying the new attribute; receiving a response to the query via the user interface from the user device; and using the response to verify the new attribute.

In example 11, the subject matter of examples 8-10 can optionally include wherein the verification process comprises transmitting the new attribute to an operator system, an operator of the operator system to verify the new attribute using public domain data.

In example 12, the subject matter of examples 8-11 can optionally include based on timestamps from the trip data, determining a time metric for the first spatial cluster and a time metric for the second spatial cluster; and determining that a difference between the time metric for the first spatial cluster and the time metric for the second spatial cluster meets or transgresses a time threshold, wherein the updating the database occurs further in response to the difference between the time metric for the first spatial cluster and the time metric for the second spatial cluster meeting or transgressing the time threshold.

In example 13, the subject matter of examples 8-12 can optionally include wherein the generating the first spatial cluster and the second spatial cluster comprises generating the first spatial cluster based on a first time period and the second spatial cluster based on a second time period.

In example 14, the subject matter of examples 8-13 can optionally include wherein the clustering algorithm comprises K means clustering algorithm.

In example 15, the subject matter of examples 8-14 can optionally include wherein the coordinates comprise a latitude and a longitude for the POI and the centroid for the first spatial cluster is an average point of the latitude and longitude for the POI in the first spatial cluster and the centroid for the second spatial cluster is an average point of the latitude and longitude for the POI in the second spatial cluster.

In example 16, the subject matter of examples 8-15 can optionally include wherein the accessing is in response to receiving an indication of a possible attribute change for the POI.

In example 17, the subject matter of examples 8-16 can optionally include wherein the new attribute comprises a new address of the POI that has moved, a new name of the POI, or a new location.

Example 18 is a machine-storage medium for improving attribute data for a point of interest (POI). The machine-storage medium configures one or more processors to perform operations comprising accessing trip data associated with the POI; generating, using a processor-implemented clustering algorithm, a first spatial cluster and a second spatial cluster using coordinates corresponding to the POI indicated in the trip data; identifying a centroid for the first spatial cluster and a centroid for the second spatial cluster; determining that a difference in distance between the centroid for the first spatial cluster and the centroid for the second spatial cluster meets or transgresses a centroid distance threshold; and in response to the determining, updating a database to indicate a new attribute for the POI, the new attribute corresponding to an attribute associated with either the first spatial cluster or the second spatial cluster.

In example 19, the subject matter of example 18 can optionally include in response to the determining, triggering a verification process to verify the new attribute is accurate, the verification process comprising causing a user interface to be presented on a user device of a user that has an association with the POI, the user interface presenting a query regarding verifying the new attribute; receiving a response to the query via the user interface from the user device; and using the response to verify the new attribute.

In example 20, the subject matter of examples 18-19 can optionally include based on timestamps from the trip data, determining a time metric for the first spatial cluster and a time metric for the second spatial cluster; and determining that a difference between the time metric for the first spatial cluster and the time metric for the second spatial cluster meets or transgresses a time threshold, wherein the updating the database occurs further in response to the difference between the time metric for the first spatial cluster and the time metric for the second spatial cluster meeting or transgressing the time threshold.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
    one or more hardware processors; and
    a memory storing instructions that, when executed by the one or more hardware processors, causes the one or more hardware processors to perform operations comprising:
        detecting, by a network system, a potential change in an attribute of a point of interest (POI) that represents a pick-up location or a drop-off location;
        based on the detecting, triggering an analysis engine of the network system to perform an analysis on trip data stored at the network system, the analysis engine performing operations comprising:
            accessing the trip data associated with the POI, the POI representing the pick-up location or the drop-off location of each trip of the trip data;
            based on the accessed trip data, generating, by a clustering module of the analysis engine using a processor-implemented clustering algorithm, a first spatial cluster and a second spatial cluster using coordinates corresponding to the POI indicated in the trip data;
            identifying, by the clustering module, a centroid for the first spatial cluster and a centroid for the second spatial cluster; and
            determining, by a threshold module of the analysis engine, that a difference in distance between the centroid for the first spatial cluster and the centroid for the second spatial cluster meets or transgresses a centroid distance threshold; and
        in response to the determining that the difference meets or transgresses the centroid distance threshold, updating, by the network system, data structures of a data storage to indicate a change in the attribute of the POI, the changed attribute corresponding to an attribute associated with either the first spatial cluster or the second spatial cluster.

2. The system of claim 1, wherein the operations further comprise, in response to the determining, triggering a verification process to verify the new attribute is accurate.

3. The system of claim 2, wherein the verification process comprises:
    generating a user interface that presents a query regarding verifying the new attribute;
    causing the user interface to be presented on a user device of a user that has an association with the POI;
    receiving a response to the query via the user interface from the user device; and
    using the response to verify the new attribute.

4. The system of claim 1, further comprising:
    based on timestamps from the trip data, determining a time metric for the first spatial cluster and a time metric for the second spatial cluster; and
    determining that a difference between the time metric for the first spatial cluster and the time metric for the second spatial cluster meets or transgresses a time threshold,
    wherein the updating the database occurs further in response to the difference between the time metric for the first spatial cluster and the time metric for the second spatial cluster meeting or transgressing the time threshold.

5. The system of claim 1, wherein the generating the first spatial cluster and the second spatial cluster comprises generating the first spatial cluster based on a first time period and the second spatial cluster based on a second time period.

6. The system of claim 1, wherein the clustering algorithm comprises K means clustering algorithm.

7. The system of claim 1, wherein:
    the coordinates comprise a latitude and a longitude for the POI and the centroid for the first spatial cluster is an average point of the latitude and longitude for the POI in the first spatial cluster and the centroid for the second spatial cluster is an average point of the latitude and longitude for the POI in the second spatial cluster; and
    the determining that the difference in distance between the centroid for the first spatial cluster and the centroid for the second spatial cluster meets or transgresses the centroid distance threshold comprising determining that a difference in distance between the average point of the latitude and longitude for the POI in the first spatial cluster and the average point of the latitude and longitude for the POI in the second spatial cluster meets or transgresses the centroid distance threshold.

8. A method comprising:

detecting, by a network system, a potential change in an attribute of a point of interest (POI) that represents a pick-up location or a drop-off location;

based on the detecting, triggering an analysis engine of the network system to perform an analysis on trip data stored at the network system, the analysis engine performing operations comprising:

accessing the trip data associated with the POI, the POI representing the pick-up location or the drop-off location of each trip of the trip data;

based on the accessed trip data, generating, by a processor and using a processor-implemented clustering algorithm, a first spatial cluster and a second spatial cluster using coordinates corresponding to the POI indicated in the trip data;

identifying, by a clustering module of the analysis engine, a centroid for the first spatial cluster and a centroid for the second spatial cluster; and determining, by a threshold module of the analysis engine, that a difference in distance between the centroid for the first spatial cluster and the centroid for the second spatial cluster meets or transgresses a centroid distance threshold; and in response to the determining that the difference meets or transgresses the centroid distance threshold, updating, by the network system, data structures of a data storage to indicate a change in the attribute of the POI, the changed attribute corresponding to an attribute associated with either the first spatial cluster or the second spatial cluster.

9. The method of claim 8, further comprising, in response to the determining, triggering a verification process to verify the new attribute is accurate.

10. The method of claim 9, wherein the verification process comprises:

causing a user interface to be presented on a user device of a user that has an association with the POI, the user interface presenting a query regarding verifying the new attribute;

receiving a response to the query via the user interface from the user device; and using the response to verify the new attribute.

11. The method of claim 9, wherein the verification process comprises transmitting the new attribute to an operator system, an operator of the operator system to verify the new attribute using public domain data.

12. The method of claim 8, further comprising:

based on timestamps from the trip data, determining a time metric for the first spatial cluster and a time metric for the second spatial cluster; and determining that a difference between the time metric for the first spatial cluster and the time metric for the second spatial cluster meets or transgresses a time threshold, wherein the updating the database occurs further in response to the difference between the time metric for the first spatial cluster and the time metric for the second spatial cluster meeting or transgressing the time threshold.

13. The method of claim 8, wherein the generating the first spatial cluster and the second spatial cluster comprises generating the first spatial cluster based on a first time period and the second spatial cluster based on a second time period.

14. The method of claim 8, wherein the clustering algorithm comprises K means clustering algorithm.

15. The method of claim 8, wherein:

the coordinates comprise a latitude and a longitude for the POI and the centroid for the first spatial cluster is an average point of the latitude and longitude for the POI in the first spatial cluster and the centroid for the second spatial cluster is an average point of the latitude and longitude for the POI in the second spatial cluster; and the determining that the difference in distance between the centroid for the first spatial cluster and the centroid for the second spatial cluster meets or transgresses the centroid distance threshold comprising determining that a difference in distance between the average point of the latitude and longitude for the POI in the first spatial cluster and the average point of the latitude and longitude for the POI in the second spatial cluster meets or transgresses the centroid distance threshold.

16. The method of claim 8, further comprising:

receiving, by a device interface of the network system, the trip data, the trip data comprising information pertaining to a service provided between the pick-up location and the drop-off location for each trip; and storing the trip data for later analysis by the network system.

17. The method of claim 8, wherein the changed attribute comprises a new address of the POI that has moved, a new name of the POI, or a new status for the POI.

18. A machine-storage medium storing instructions that, when executed by one or more processors of a machine, cause the one or more processors to perform operations comprising:

detecting, by a network system, a potential change in an attribute of a point of interest (POI) that represents a pick-up location or a drop-off location;

based on the detecting, triggering an analysis engine of the network system to perform an analysis on trip logs stored at the network system, the analysis engine performing operations comprising:

accessing a plurality of trip logs associated with the POI, the POI representing the pick-up location or the drop-off location of each trip of the plurality of trip logs;

based on the accessed plurality of trip logs, generating, by a clustering module of the analysis engine using a processor-implemented clustering algorithm, a first spatial cluster and a second spatial cluster using coordinates corresponding to the POI indicated in the trip logs;

identifying, by the clustering module, a centroid for the first spatial cluster and a centroid for the second spatial cluster; and determining, by a threshold module of the analysis engine, that a difference in distance between the centroid for the first spatial cluster and the centroid for the second spatial cluster meets or transgresses a centroid distance threshold; and in response to the determining that the difference meets or transgresses the centroid distance threshold, updating, by the network system, data structures of a data storage to indicate a new address for the POI, the new address corresponding to a location associated with either the first spatial cluster or the second spatial cluster.

19. The machine-storage medium of claim 18, wherein the operations further comprise, in response to the determining, triggering a verification process to verify the new address is accurate, the verification process comprising:

causing a user interface to be presented on a user device of a user that has an association with the POI, the user interface presenting a query regarding verifying the new address;

receiving a response to the query via the user interface from the user device; and using the response to verify the new address.

20. The machine-storage medium of claim 18, wherein the operations further comprise:

based on timestamps from the trip logs, determining a time metric for the first spatial cluster and a time metric for the second spatial cluster; and determining that a difference between the time metric for the first spatial cluster and the time metric for the second spatial cluster meets or transgresses a time threshold, wherein the updating the database occurs further in response to the difference between the time metric for the first spatial cluster and the time metric for the second spatial cluster meeting or transgressing the time threshold.

* * * * *